(No Model.)

F. BUSCH.
COMBINED HEATER AND SHADE.

No. 471,742. Patented Mar. 29, 1892.

WITNESSES:

INVENTOR
Frederick Busch
BY
ATTORNEYS.

UNITED STATES PATENT OFFICE.

FREDERICK BUSCH, OF HOBOKEN, NEW JERSEY.

COMBINED HEATER AND SHADE.

SPECIFICATION forming part of Letters Patent No. 471,742, dated March 29, 1892.

Application filed November 21, 1891. Serial No. 412,643. (No model.)

*To all whom it may concern:*

Be it known that I, FREDERICK BUSCH, a citizen of the United States, and a resident of Hoboken, in the county of Hudson and State of New Jersey, have invented certain new and useful Improvements in a Combined Heater and Shade, of which the following is a specification.

The object of this invention is to provide a cheap and simple heater to be used in connection with the ordinary taper night-lights or with a gas-burner, so as to facilitate the heating of milk or other liquids at night for the use of infants, invalids, and other purposes; and the invention consists of a heater that comprises an annular cup, stays for supporting said cup, and a ring-shaped base for said stays, which base is supported above the taper-light, gas-burner, or other heating device, and provided with a seat at the under side of the base.

The invention consists, secondly, of a heater composed of an annular cup, stays for supporting said cup, and a ring-shaped supporting-base for said stays provided with a seat at the under side of the base, one of the stays being made wide enough so as to form a shade for the light.

Figure 1:
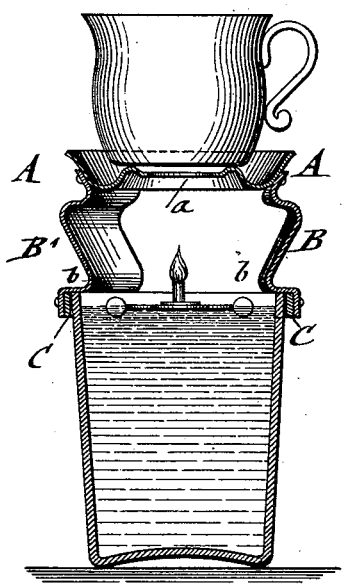
Figure 2:
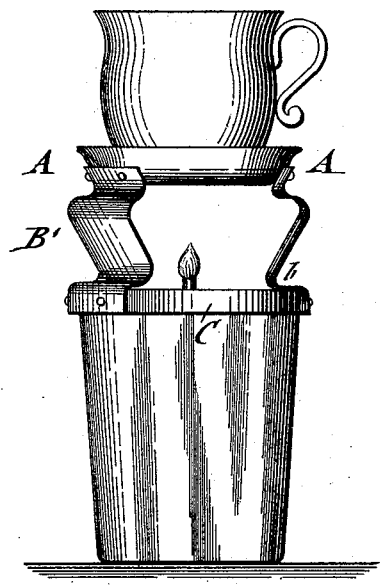
Figure 3:
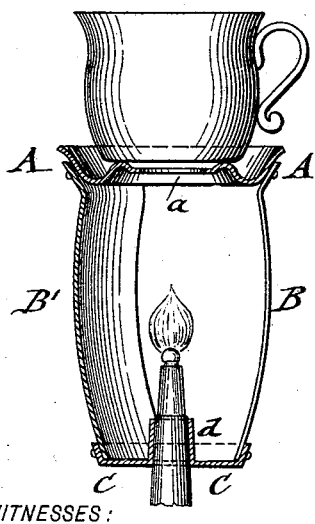
Figure 4:
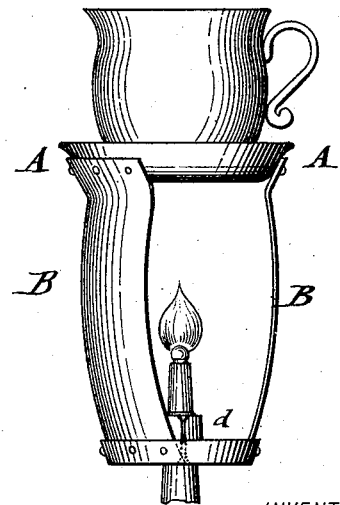

In the accompanying drawings, Figure 1 represents a vertical central section of my improved heater and shade for night-lights and other lighting devices, said heater being shown in position on one of the ordinary taper night-lights. Fig. 2 is a side elevation of Fig. 1. Fig. 3 is a modified form of the combined heater and shade shown as applied to a gas-burner; and Fig. 4 is a side elevation of Fig. 3.

Similar letters of reference indicate corresponding parts in all the figures.

Referring to the drawings, A represents an annular cup, which is provided with a central aperture $a$ of sufficient size to permit the heating-flame that is located below the cup to heat up a cup, saucer, pan, or other vessel in which the liquid to be heated is placed.

The annular cup A is supported by two or more stays B, which are riveted or otherwise attached at their upper ends to the annular cup A and which are attached at their lower ends to a ring-shaped base C, that is applied to the rim of the tumbler in which the taper-light is placed, as shown in Fig. 1, or to a gas-burner or other suitable source of light and heat, as shown in Fig. 3. The supporting-base C may be provided in the latter case with a conical split sleeve $d$, (shown in Fig. 4,) which acts in the nature of a spring on the burner, so as to support the heating device rigidly in position.

In the heating device shown in Figs. 1 and 2 the stays are preferably bent inward at their lower ends above their connection with the ring-shaped base C, so as to form shoulders $b$, by which the heater rests on the rim of the tumbler. The shoulders $b$ form a seat for the ring-shaped base C at the under side of the same.

The annular cup A serves for receiving any overflow, and prevents thereby the dripping of liquid into the light or into the tumbler containing the taper-light.

The stays B are either made of bent sheet-metal strips or of wire, or of any other suitable material, one of the stays being made wider, so as to take up about one-third of the circumference of the heating device and form thereby a shade B', by which the radiation of the rays from the light in the direction of the shade is prevented, while the taper-light or burner-flame emits sufficient light for illuminating the surroundings.

My improved heating device has the advantage that it can be used either in connection with a taper-light or with a small gas-flame, so as to keep milk or other liquid food in warm condition ready to be used by an infant or invalid, whenever required, without necessitating the getting up and heating the same. It utilizes the heat of the taper-light or small flame of the gas-burner, and is of great convenience to mothers, nurses, and others.

The heating device is constructed, preferably, of sheet metal. All the parts can be stamped and readily attached to each other by rivets or otherwise, so as to form a cheap and extremely useful heating device for the purposes mentioned.

Having thus described my invention, what I claim as new, and desire to secure by Letters Patent, is—

1. A heater for night-lights, gas-burners, &c., composed of an annular drip-cup, a ring-shaped base having a seat at the under side thereof, and stays connecting the cup with the base, substantially as set forth.

2. A heater for night-lights, gas-burners, &c., composed of an annular drip-cup, a ring-shaped base having a seat at the under side thereof, a shade extending from the cup to the base, and a stay connecting the cup and base, substantially as set forth.

In testimony that I claim the foregoing as my invention I have signed my name in presence of two subscribing witnesses.

FREDERICK BUSCH.

Witnesses:
 PAUL GOEPEL,
 CHARLES SCHROEDER.